United States Patent
Stotzer et al.

(10) Patent No.: US 6,178,499 B1
(45) Date of Patent: Jan. 23, 2001

(54) INTERRUPTABLE MULTIPLE EXECUTION UNIT PROCESSING DURING OPERATIONS UTILIZING MULTIPLE ASSIGNMENT OF REGISTERS

(75) Inventors: Eric Stotzer; Richard H. Scales, both of Houston, TX (US)

(73) Assignee: Texas Instruments Incorporated, Dallas, TX (US)

( * ) Notice: Under 35 U.S.C. 154(b), the term of this patent shall be extended for 0 days.

(21) Appl. No.: 09/212,143

(22) Filed: Dec. 15, 1998

Related U.S. Application Data (60) Provisional application No. 60/070,089, filed on Dec. 31, 1997.

(51) Int. Cl.$^7$ ............................................. G06F 9/38
(52) U.S. Cl. ............................................. 712/241; 712/244
(58) Field of Search ................................. 712/241, 244

(56) References Cited

U.S. PATENT DOCUMENTS

| | | | |
|---|---|---|---|
| 4,984,151 | * | 1/1991 | Dujard ............................... 712/241 |
| 5,226,128 | * | 7/1993 | Rau et al. ........................... 712/241 |
| 5,333,280 | * | 7/1994 | Ishikavneu et al. ................ 712/241 |
| 5,606,520 | * | 2/1997 | Gove et al. ......................... 708/491 |
| 5,644,193 | * | 7/1997 | Tirumalai .............................. 717/9 |
| 5,774,711 | * | 6/1998 | Henry et al. ........................ 712/244 |
| 5,794,029 | * | 8/1998 | Babaian et al. ..................... 712/248 |
| 5,958,048 | * | 9/1999 | Babaian et al. ..................... 712/241 |
| 6,003,128 | * | 12/1999 | Tran .................................... 712/241 |
| 6,014,741 | * | 1/2000 | Mahalingaiah ..................... 712/233 |
| 6,016,399 | * | 1/2000 | Chang ................................. 712/241 |
| 6,032,252 | * | 2/2000 | Petro et al. ......................... 712/233 |
| 6,038,649 | * | 3/2000 | Ozavea et al. ..................... 712/217 |
| 6,044,222 | * | 3/2000 | Simons et al. ..................... 712/237 |
| 6,055,628 | * | 4/2000 | Seshan et al. ..................... 712/235 |

* cited by examiner

*Primary Examiner*—William M. Treat
(74) *Attorney, Agent, or Firm*—Robert D. Marshall, Jr.; W. James Brady, III; Frederick J. Telecky, Jr.

(57) ABSTRACT

A method of operating a multiple execution unit microprocessor in a software pipelined loop is disclosed. This method allows the microprocessor to respond to interrupt requests and other runtime conditions during execution of a software pipelined loop utilizing multiple assignment of registers. In one embodiment, the method comprises branching out of the software pipelined loop, upon occurrence of an interrupt request, to an interrupt epilog that consumes in-flight register values and sets the interrupt return pointer to the address of an interrupt prolog. The interrupt is then taken. The interrupt prolog is a subset of the loop prolog, and restores the processor to an operational state equivalent to one that would have existed had the interrupt not been taken. Loop execution is then resumed without data loss or corruption.

16 Claims, 2 Drawing Sheets

INTERRUPTABLE MULTIPLE EXECUTION UNIT PROCESSING DURING OPERATIONS UTILIZING MULTIPLE ASSIGNMENT OF REGISTERS

This application claims priority under 35 USC §119(e)(1) of Provisional application Ser. No. 60/070,089, filed Dec. 31, 1997.

FIELD OF THE INVENTION

The present invention pertains generally to the operation of multiple execution unit microprocessors, and pertains more particularly to methods usable on such microprocessors for exiting and reentering software pipelined loops in response to runtime conditions.

BACKGROUND OF THE INVENTION

A microprocessor is a circuit that combines the instruction-handling, arithmetic, and logical operations of a computer on a single chip. A digital signal processor (DSP) is a microprocessor optimized to handle large volumes of data efficiently. Such processors are central to the operation of many of today's electronic products, such as high-speed modems, high-density disk drives, digital cellular phones, and complex automotive systems, and will enable a wide variety of other digital systems in the future. The demands placed upon DSPs in these environments continue to grow as consumers seek increased performance from their digital products.

Figure 1:
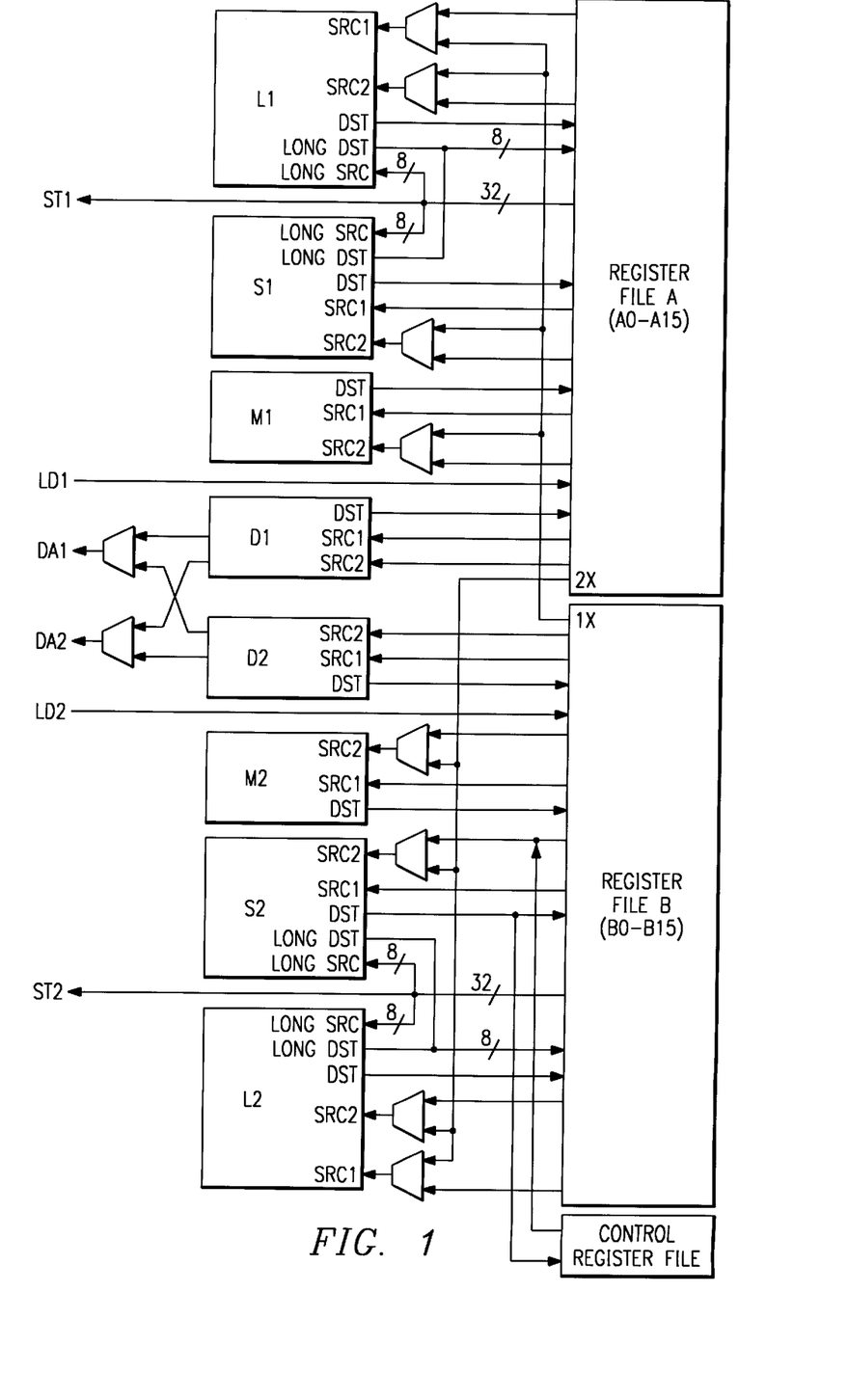
FIG. 1 is a block diagram depicting the execution units and registers of a multiple-execution unit processor.

Designers have succeeded in increasing the performance of DSPs generally by increasing clock frequencies, by removing architectural bottlenecks in DSP circuit design, by incorporating multiple execution units on a single processor circuit, and by developing optimizing compilers that schedule operations to be executed by the processor in an efficient manner. As further increases in clock frequency become more difficult to achieve, designers have embraced the multiple execution unit processor as a means of achieving enhanced DSP performance. For example, FIG. 1 shows a block diagram of a DSP having eight execution units, L1, S1, M1, D1, L2, S2, M2, and D2. These execution units operate in parallel to perform multiple operations, such as addition, multiplication, addressing, logic functions, and data storage and retrieval, simultaneously.

Theoretically, the performance of a multiple execution unit processor is proportional to the number of execution units available. However, utilization of this performance advantage depends on the efficient scheduling of operations so that most of the execution units have a task to perform each clock cycle. Efficient scheduling is particularly important for looped instructions, since in a typical runtime application the processor will spend the majority of its time in loop execution.

Figure 2A:
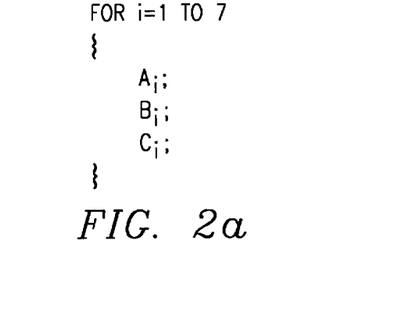
FIG. 2a depicts a simple scalar loop of computer instructions.
Figure 2B:
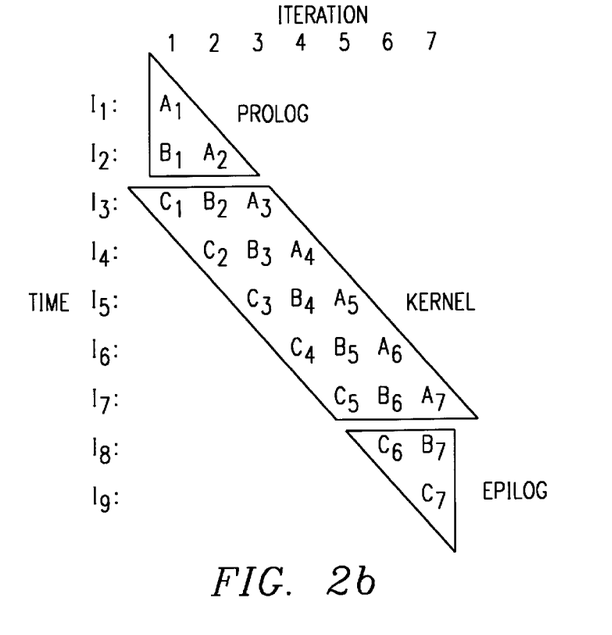
FIGS. 2b and 2c, respectively, depict an alternate execution schedule for the scalar loop of FIG. 2a and a new software pipelined loop based on this execution schedule.
Figure 2C:
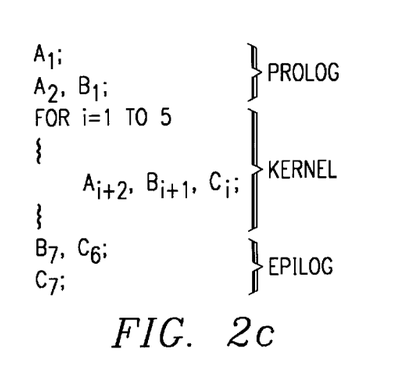

One effective way in which looped instructions can be arranged to take advantage of multiple execution units is with a software pipelined loop. In a conventional scalar loop, all instructions execute for a single iteration before any instructions execute for following iterations. In a software pipelined loop, the order of operations is rescheduled such that one or more iterations of the original loop begin execution before the preceding iteration has finished. Referring to FIG. 2a, a simple loop containing 7 iterations of the operations A, B, and C is shown. FIG. 2b depicts an alternative execution schedule for the loop of FIG. 2a, where a new iteration of the original loop is begun each clock cycle. For clock cycles $I_3$–$I_7$, the same instruction ($A_n, B_{n-1}, C_{n-2}$) is executed each clock cycle in this schedule; if multiple execution units are available to execute these operations in parallel, the code can be restructured to perform this repeated instruction in a loop. The repeating pattern of A,B,C (along with loop control operations) thus forms the loop kernel of a new, software pipelined loop that executes the instructions at clock cycles $I_3$–$I_7$ in 5 loops. FIG. 2c depicts such a loop. The instructions executed at clock cycles $I_1$ and $I_2$ of FIG. 2b must still be executed first in order to properly "fill" the software pipelined loop; these instructions are referred to as the loop prolog. Likewise, the instructions executed at clock cycles $I_8$ and $I_9$ of FIG. 2b must still be executed in order to properly "drain" the software pipeline; these instructions are referred to as the loop epilog (note that in many situations the loop epilog may be deleted through a technique known as speculative execution).

The simple example of FIGS. 2a–2c illustrates the basic principles of software pipelining, but other considerations such as dependencies and conflicts may constrain a particular scheduling solution. For an explanation of software pipelining in more detail, see Vicki H. Allan, *Software Pipelining*, 27 ACM Computing Surveys 367 (1995).

Another technique commonly used with multiple execution unit processors and software pipelined loops is multiple assignment of registers. Referring again to FIG. 1, registers A0–A15 and B0–B15 are connected to execution units L1, S1, M1, D1, L2, S2, M2, and D2. These registers are used to store, e.g., operands, results of operations, counter values, and conditional values during execution. Typically, single assignment of such registers is preferred; in single assignment, once an execution unit utilizes a register in an operation, that register may not be re-used until the original operation completes. With multiple assignment of registers, however, registers may be re-used according to known hardware delays. For example, a first operation may begin execution on unit D1 to load a value into register A4 from memory, an operation that requires five clock cycles to complete (if an operation requires more than one clock cycle to complete, the additional clock cycles are typically referred to as delay slots). With single assignment, A4 could not be used for any other purpose during those five clock cycles, although the value loaded from memory will not actually appear in register A4 until the end of the fifth cycle. With multiple assignment, A4 could be used for other purposes during the delay slots of the load from memory operation, as long as the register is freed prior to completion of the load operation.

Multiple assignment of registers is often desirable in pipelined loops, where the overlapping of many multiple-clock cycle instructions such as loads, multiplies, and branches is required. Single assignment of registers under these conditions may require that parallelism be decreased, as some schedules will be impossible to implement because of the large number of registers required by single assignment. Multiple assignment will often result in reduced register pressure and increased parallelism under these conditions. The main drawback of multiple assignment is that it requires that the instructions execute in an expected order—if an unexpected order of execution is encountered, there is a high possibility that register data will be corrupted.

SUMMARY OF THE INVENTION

In microprocessor operation, it is often desirable to allow for prompt response to the occurrence of runtime conditions (e.g. interrupts, data conditions, or processing irregularities).

Unfortunately, because of the data corruption condition that may result from unexpected execution order, responses to runtime conditions such as interrupts must generally be disabled around code blocks utilizing multiple assignment of registers. It has now been recognized that if such a code block is a software pipelined loop requiring a large number of iterations to complete, the time delay in responding to runtime conditions due to disabling around such a code block may be unacceptable.

The prior art has attempted to solve this problem by using software pipelined loops with single assignment of registers. Although this approach does allow a microprocessor to respond relatively quickly to runtime conditions such as interrupts, it is recognized herein that this approach often results in suboptimal scheduling for a software pipelined loop itself. Since performance of a software pipelined loop may be as critical as interruptability, the single register assignment approach may also be unacceptable.

The prior art has also attempted to solve this problem by adding state-saving hardware to a processor architecture. This specialized hardware saves the entire operating state of the processor before responding to an interrupt, and restores this state upon return from interrupt. This approach can require substantial added hardware complexity and cost for a large pipelined processor. It is therefore an object of the present invention to obviate the need for such state-saving hardware.

In accordance with the present invention, a method of operating a microprocessor is disclosed that allows both for interruptability and for efficient assignment of registers. This method allows multiple assignment of registers within software pipelined loops. However, this method also allows such loops to be exited and re-entered upon the occurrence of a runtime condition. The present invention is believed to be the first to allow for exit and re-entrance to a software pipelined loop with multiply-assigned registers without employing special state-saving hardware.

In one aspect of the invention, a method of operating a processor having a plurality of execution units in communication with a plurality of registers is disclosed. This method comprises the step of executing a pipelined loop kernel comprising a set of kernel instructions for a plurality of iterations, wherein this loop kernel utilizes a plurality of execution units with multiple assignment of registers to produce an output result. This method further comprises the step of leaving the pipelined loop prematurely in response to a runtime condition, such that at least some of the iterations of the pipelined loop remain unfinished. The method further comprises (e.g., after the processor has performed some function in response to the runtime condition) executing fill instructions to place the processor in an operational state equivalent to that which would have existed had it not been for the occurrence of the premature exit from the pipelined loop. Finally, the method comprises re-entering the pipelined loop kernel and continuing execution of the unfinished iterations (preferably subject to further interruption). Although the runtime condition itself may cause differences in processor execution upon return to the loop, it is an object of the invention that the steps of leaving and re-entering the pipelined loop kernel cause no differences in the output result of the pipelined loop.

BRIEF DESCRIPTION OF THE DRAWINGS

The invention may be best understood with reference to the drawing, wherein.

DETAILED DESCRIPTION OF THE PREFERRED EMBODIMENTS

Several illustrative embodiments are described herein for the present invention. Although it is believed that the present invention may be utilized in conjunction with virtually any processor having multiple execution units and capable of multiple register assignment, for illustrative purposes these embodiments are described with reference to a specific processor family, the Texas Instruments TMS320C62xx. Those of ordinary skill in the pertinent art should comprehend the description below in sufficient detail to enable them to reproduce the invention; however, for specific data related to processor architecture, instruction set, and operation, the interested reader is referred to the *Texas Instruments TMS320C62xx CPU and Instruction Set Reference Guide* (1997), which is incorporated herein by reference.

Several definitions should also be useful to the reader. As used herein, an operation is a function performable by an execution unit on a processor in one or more clock cycles. An in-flight operation is one which has begun but not finished execution. An instruction is a set of one or more operations that will be dispatched to the execution units during the same clock cycle. As used herein, a runtime condition is a state, either internal or external to the processor, that may occur while a processor is executing instructions, and yet the exact moment or frequency of it occurrence is essentially unpredictable by the executing code. Examples of such conditions are interrupts, data conditions, and non-counter register conditions (e.g., overflow or underflow).

Continuing with definitions, an operational state is defined by the instructions executing on all processors at a given clock cycle—because some instructions require multiple clock cycles to complete, in-flight operations are also comprehended in the operational state. An equivalent operational state reproduces the timing of in-flight operations of an original operational state, although actual data values may differ because of intermediate processing. For example, a loop may be interrupted when it is about to use the kth element of an array, and the interrupt routine may place a new value in the kth element. When the operational state is restored, the kth element is still the next element to be used, such that an equivalent operational state exists even though the value of element k may have changed.

The following examples all implement the same scalar loop, which implements a dot product of two arrays a[i] and b[i] for i=600 on an eight execution unit processor such as the one depicted in FIG. 1. Although the complexity of a software pipelined loop benefitting from the present invention may be much greater than that of a dot product, this function was chosen for its simplicity such that the invention may be readily discerned in the examples.

Comparative Code Example 1 below illustrates a simple software pipelined loop implementation of the dot product. This implementation comprises a prolog and a single-instruction loop kernel that performs operations on all eight processors (the ∥ symbol indicates operations that execute in parallel with an immediately preceding operation). Note that this implementation uses speculative execution, and thus contains no loop epilog. Because the multiply (MPY and MPYH), branch (B), and load operations (LDW) in this loop all operate with delay slots, the registers are multiply-assigned. In order for the loop to operate properly, it cannot be interrupted, and interrupts are disabled prior to execution of the loop prolog. Thus the primary disadvantage of this loop is that the dot product cannot be interrupted before it completes all iterations. The advantages of this loop are that the kernel uses only nine registers and that the code size is relatively small.

Comparative Code Example 2 below illustrates a software pipelined loop implementation of the dot product that is constrained to use single assignment of registers. Because the loop uses single assignment, it is interruptable. However, the kernel instructions in this loop are "unrolled", or duplicated, such that the kernel contains at least one instruction that does not execute in the delay slots of a branch instruction—otherwise, because of hardware constraints, an interrupt would not be serviced in the loop kernel. The interrupt latency of this loop is approximately 12 cycles. Note that in addition to larger code size, this implementation uses 18 registers—twice the number needed by the multiple assignment implementation explained above.

```
                         Comparative Code Example 1

_dotp:
            MV      .L2X    A4,B7
||          MV      .L1X    B4,A3
            MVK     .S2     0x258,B0        ; cntr = 600
            MVC     .S2     CSR,B8
||          ZERO    .L1     A0              ; multiply result = 0
||          ZERO    .L2     B5              ; multiply result = 0
            AND     .L1X    -2,B8,A4
            MVC     .S2X    A4,CSR          ; Disable interrupts
||          SUB     .L2     B0,7,B0
;*------------------------------------------------------------------------------*
L2:         ; PIPED LOOP PROLOG
; LOOP:     .trip 600
            LDW     .D2     *B7++,B6        ; load ai & a1 from memory
||          LDW     .D1     *A3++,A4        ; load bi & b1 from memory
    [ B0]   SUB     .S2     B0,0x1,B0       ; decrement loop counter
||          LDW     .D2     *B7++,B6        ;@ load ai & a1 from memory
||          LDW     .D1     *A3++,A4        ;@ load bi & b1 from memory
    [ B0]   B       .S1     L3              ; branch to loop
||  [ B0]   SUB     .S2     B0,0x1,B0       ;@ decrement loop counter
||          LDW     .D2     *B7++,B6        ;@@ load ai & a1 from memory
||          LDW     .D1     *A3++,A4        ;@@ load bi & b1 from memory
    [ B0]   B       .S1     L3              ;@ branch to loop
||  [ B0]   SUB     .S2     B0,0x1,B0       ;@@ decrement loop counter
||          LDW     .D2     *B7++,B6        ;@@@ load ai & a1 from memory
||          LDW     .D1     *A3++,A4        ;@@@ load bi & b1 from memory
    [ B0]   B       .S1     L3              ;@@ branch to loop
||  [ B0]   SUB     .S2     B0,0x1,B0       ;@@@ decrement loop counter
||          LDW     .D2     *B7++,B6        ;@@@@ load ai & a1 from memory
||          LDW     .D1     *A3++,A4        ;@@@@ load bi & b1 from memory
            MPY     .M2X    B6,A4,B4        ; ai * bi
||          MPYH    .M1X    B6,A4,A5        ; ai+1 * bi+1
||  [ B0]   B       .S1     L3              ;@@@ branch to loop
||  [ B0]   SUB     .S2     B0,0x1,B0       ;@@@@ decrement loop counter
||          LDW     .D2     *B7++,B6        ;@@@@@ load ai & a1 from memory
||          LDW     .D1     *A3++,A4        ;@@@@@ load bi & b1 from memory
            MPY     .M2X    B6,A4,B4        ;@ ai * bi
||          MPYH    .M1X    B6,A4,A5        ;@ ai+1 * bi+1
||  [ B0]   B       .S1     L3              ;@@@@ branch to loop
||  [ B0]   SUB     .S2     B0,0x1,B0       ;@@@@@ decrement loop counter
||          LDW     .D2     *B7++,B6        ;@@@@@@ load ai & a1 from memory
||          LDW     .D1     *A3++,A4        ;@@@@@@ load bi & b1 from memory
;** ----------------------------------------------------------------------------*
L3:         ; PIPED LOOP KERNEL
            ADD     .L2     B4,B5,B5        ; sum0 += (ai * bi)
||          ADD     .L1     A5,A0,A0        ; sum1 += (ai+1 * bi+1)
||          MPY     .M2X    B6,A4,B4        ;@@ ai * bi
||          MPYH    .M1X    B6,A4,A5        ;@@ ai+1 * bi+1
||  [ B0]   B       .S1     L3              ;@@@@@ branch to loop
||  [ B0]   SUB     .S2     B0,0x1,B0       ;@@@@@@ decrement loop counter
||          LDW     .D2     *B7++,B6        ;@@@@@@@ load ai & a1 from memory
||          LDW     .D1     *A3++,A4        ;@@@@@@@ load bi & b1 from memory
;** ----------------------------------------------------------------------------*
L4:         ; PIPED LOOP EPILOG
            ; REMOVED
;** ----------------------------------------------------------------------------*
            MVC     .S2     B8,CSR          ; Enable interrupts
            B       .S2     B3              ; Return from subroutine
            NOP             4
            ADD     .L1X    B5,A0,A4
```

| | | | Comparative Code Example 2 | |
|---|---|---|---|---|
| _dotp: | | | | |
| | MV | .L2X | A4,B7 | ; \|3\| |
| \|\| | MV | .L1X | B4,A0 | ; \|3\| |
| \|\| | ZERO | .L2 | B4 | ; \|9\| multiply result = 0 |
| \|\| | ZERO | .L1 | A4 | ; \|10\| multiply result = 0 |
| \|\| | MVK | .S2 | 0x64,B0 | ; \|8\| cntr = 600/6 |
;*------------------------------------------------------------------------------*
L2:           ; PIPED LOOP PROLOG
; LOOP:       .trip 100

| | | | | |
|---|---|---|---|---|
| | LDW | .D2 | *B7++(24),B6_0 | ; \|14\| load ai & a1 from memory |
| \|\| | LDW | .D1 | *A0++(24),A3_0 | ; \|15\| load bi & b1 from memory |
| | LDW | .D2 | *-B7(20),B6_1 | ; \|21\| load ai & a1 from memory |
| \|\| | LDW | .D1 | *-A0(20),A3_1 | ; \|22\| load bi & b1 from memory |
| | LDW | .D2 | *-B7(16),B6_2 | ; \|28\| load ai & a1 from memory |
| \|\| | LDW | .D1 | *-A0(16),A3_2 | ; \|29\| load bi & b1 from memory |
| | LDW | .D2 | *-B7(12),B6_3 | ; \|35\| load ai & a1 from memory |
| \|\| | LDW | .D1 | *-A0(12),A3_3 | ; \|36\| load bi & b1 from memory |
| | LDW | .D2 | *-B7(8),B6_4 | ; \|42\| load ai & a1 from memory |
| \|\| | LDW | .D1 | *-A0(8),A3_4 | ; \|43\| load bi & b1 from memory |
| | LDW | .D2 | *-B7(4),B6_5 | ; \|49\| load ai & a1 from memory |
| \|\| | LDW | .D1 | *-A0(4),A3_5 | ; \|50\| load bi & b1 from memory |
| \|\| | MPY | .M2X | B6_0,A3_0,B5_0 | ; \|16\| ai * bi |
| \|\| | MPYH | .M1X | B6_0,A3_0,A5_0 | ; \|17\| ai+1 * bi+1 |
| [ B0] | SUB | .S2 | B0,0x1,B0 | ; \|56\| decrement loop counter |
| \|\| | MPY | .M2X | B6_1,A3_1,B5_1 | ; \|23\| ai * bi |
| \|\| | MPYH | .M1X | B6_1,A3_1,A5_1 | ; \|24\| ai+1 * bi+1 |
| \|\| | LDW | .D2 | *B7++(24),B6_0 | ;@ \|14\| load ai & a1 from memory |
| \|\| | LDW | .D1 | *A0++(24),A3_0 | ;@ \|15\| load bi & b1 from memory |
;** ------------------------------------------------------------------------------*
L3:           ; PIPED LOOP KERNEL

| | | | | |
|---|---|---|---|---|
| | MPY | .M2X | B6_2,A3_2,B5_0 | ; \|30\| ai * bi |
| \|\| | MPYH | .M1X | B6_2,A3_2,A5_0 | ; \|31\| ai+1 * bi+1 |
| \|\| [ B0] | B | .S1 | L3 | ; \|57\| branch to loop |
| \|\| | ADD | .L2 | B5_0,B4,B4 | ; \|18\| sum0 += (ai * bi) |
| \|\| | ADD | .L1 | A5_0,A4,A4 | ; \|19\| sum1 += (ai+1 * bi+1) |
| \|\| | LDW | .D2 | *-B7(20),B6_1 | ;@ \|21\| load ai & a1 from memory |
| \|\| | LDW | .D1 | *-A0(20),A3_1 | ;@ \|22\| load bi & b1 from memory |
| | MPY | .M2X | B6_3,A3_3,B5_1 | ; \|37\| ai * bi |
| \|\| | MPYH | .M1X | B6_3,A3_3,A5_1 | ; \|38\| ai+1 * bi+1 |
| \|\| | ADD | .L2 | B5_1,B4,B4 | ; \|25\| sum0 += (ai * bi) |
| \|\| | ADD | .L1 | A5_1,A4,A4 | ; \|26\| sum1 += (ai+1 * bi+1) |
| \|\| | LDW | .D2 | *-B7(16),B6_2 | ;@ \|28\| load ai & a1 from memory |
| \|\| | LDW | .D1 | *-A0(16),A3_2 | ;@ \|29\| load bi & b1 from memory |
| | MPY | .M2X | B6_4,A3_4,B5_0 | ; \|44\| ai * bi |
| \|\| | MPYH | .M1X | B6_4,A3_4,A5_0 | ; \|45\| ai+1 * bi+1 |
| \|\| | ADD | .L2 | B5_0,B5,B5 | ; \|32\| sum0 += (ai * bi) |
| \|\| | ADD | .L1 | A5_0,A4,A4 | ; \|33\| sum1 += (ai+1 * bi+1) |
| \|\| | LDW | .D2 | *-B7(12),B6_3 | ;@ \|35\| load ai & a1 from memory |
| \|\| | LDW | .D1 | *-A0(12),A3_3 | ;@ \|36\| load bi & b1 from memory |
| | MPY | .M2X | B6_5,A3_5,B6_1 | ; \|51\| ai * bi |
| \|\| | MPYH | .M1X | B6_5,A3_5,A5_1 | ; \|52\| ai+1 * bi+1 |
| \|\| | ADD | .L2 | B5_1,B5,B5 | ; \|39\| sum0 += (ai * bi) |
| \|\| | ADD | .L1 | A4_1,A4,A4 | ; \|40\| sum1 += (ai+1 * bi+1) |
| \|\| | LDW | .D2 | *-B7(8),B6_4 | ;@ \|42\| load ai & a1 from memory |
| \|\| | LDW | .D1 | *-A0(8),A3_4 | ;@ \|43\| load bi & b1 from memory |
| \|\| | ADD | .L2 | B5_0,B5,B5 | ; \|46\| sum0 += (ai * bi) |
| \|\| | ADD | .L1 | A4_0,A4,A4 | ; \|47\| sum1 += (ai+1 * bi+1) |
| \|\| | MPY | .M2X | B6_0,A3_0,B5_0 | ;@ \|16\| ai * bi |
| \|\| | MPYH | .M1X | B6_0,A3_0,A5_0 | ;@ \|17\| ai+1 * bi+1 |
| \|\| | LDW | .D2 | *-B7(4),B6_5 | ;@ \|49\| load ai & a1 from memory |
| \|\| | LDW | .D1 | *-A0(4),A3_5 | ;@ \|50\| load bi & b1 from memory |
| \|\| | ADD | .L2 | B5_0,B5,B5 | ; \|53\| sum0 += (ai * bi) |
| \|\| | ADD | .L1 | A4_0,A4,A4 | ; \|54\| sum1 += (ai+1 * bi+1) |
| \|\| [ B0] | SUB | .S2 | B0,0x1,B0 | ;@ \|56\| decrement loop counter |
| \|\| | MPY | .M2X | B6_1,A3_1,B5_1 | ;@ \|23\| ai * bi |
| \|\| | MPYH | .M1X | B6_1,A3_1,A5_1 | ;@ \|24\| ai+1 * bi+1 |
| \|\| | LDW | .D2 | *B7++(24),B6_0 | ;@@ \|14\| load ai & a1 from memory |
| \|\| | LDW | .D1 | *A0++(24),A3_0 | ;@@ \|15\| load bi & b1 from memory |
;** ------------------------------------------------------------------------------*
L4:           ; PIPED LOOP EPILOG
              ; REMOVED
;** ------------------------------------------------------------------------------*

| | | | | |
|---|---|---|---|---|
| | B | .S2 | B3 | ; Return from subroutine |
| | NOP | | 4 | |
| | ADD | .L1X | B4,A4,A4 | ; \|59\| |

The code example shown in Example 1 below operates according to the present invention; thus, this example utilizes the multiple assignment concept of Comparative Example 1, but is interruptable, like Comparative Example 2. This code example, like Comparative Example 1, requires the explicit disabling of interrupts during its execution; otherwise, interrupt servicing might violate the known execution order required for multiple assignment of registers. However, the loop kernel of Example 1 checks for the presence of and explicitly responds to interrupts. Thus, Example 1 operates with approximately the same interrupt latency as Comparative Example 2, 12 cycles, and yet requires only three extra registers to handle interrupts, instead of the nine extra registers required by Comparative Example 2.

Example 1

```
_dotp:
OFFSET       .set        KERNEL — INTERRUPT_EPILOG
             MV          .L2X        A4,B8                    ;
||           MV          .L1X        B4,A5                    ;
             MVK         .S1         0x64,A1                  ; cntr = 600/6
||           ZERO        .L2         B6                       ; multiply result = 0
||           ZERO        .L1         A0                       ; multiply result = 0
             MVK         .S2         KERNEL,B5                ; set up loop branch address
             MVKH        .S2         KERNEL,B5                ;
;*------------------------------------------------------------------------------------------------------------*
PROLOG:                  ; PIPED LOOP PROLOG
; LOOP:      .trip 100
             LDW         .D2         *B8++(24),B4             ; |17| load ai & a1 from memory
||           LDW         .D1         *A5++(24),A3             ; |18| load bi & b1 from memory
INTERRUPT_PROLOG:
             LDW         .D2         *-B8(20),B4              ; |24| load ai & a1 from memory
||           LDW         .D1         *-A5(20),A4              ; |25| load bi & b1 from memory
             LDW         .D2         *-B8(16),B7              ; |31| load ai & a1 from memory
||           LDW         .D1         *-A5(16),A3              ; |32| load bi & b1 from memory
             LDW         .D2         *-B8(12),B4              ; |38| load ai & a1 from memory
||           LDW         .D1         *-A5(12),A0              ; |39| load bi & b1 from memory
             MVC         .S2         ISTP,B7                  ; |61| rd Interrupt Flag Register
||           LDW         .D2         *-B8(8),B7               ; |45| load ai & a1 from memory
||           LDW         .D1         *-A5(8),A3               ; |46| load bi & b1 from memory
             EXTU        .S2         B7,0x17,0x1b,B0          ; |62| mask out interrupt bits
||           LDW         .D2         *-B8(4),B6               ; |52| load ai & a1 from memory
||           LDW         .D1         *-A5(4),A0               ; |53| load bi & b1 from memory
||           MPY         .M2X        B4,A3,B4                 ; |19| ai * bi
||           MPYH        .M1X        B4,A3,A4                 ; |20| ai+1 * bi+1
      [ A1]  SUB         .S1         A1,0x1,A1                ; |59| decrement loop counter
||    [ B0]  ADDK        .S2         0x64,B5                  ; |63| NO BRANCH — interrupt
||           MPY         .M2X        B4,A4,B6                 ; |26| ai * bi
||           MPYH        .M1X        B4,A4,A4                 ; |27| ai+1 * bi+1
||           LDW         .D2         *B8++(24),B4             ;@ |17| load ai & a1 from memory
||           LDW         .D1         *A5++(24),A3             ;@ |18| load bi & b1 from memory
;**------------------------------------------------------------------------------------------------------------*
KERNEL:                  ; PIPED LOOP KERNEL
             MPY         .M2X        B7,A3,B6                 ; |33| ai * bi
||           MPYH        .M1X        B7,A3,A4                 ; |34| ai+1 * bi+1
||    [ A1]  B           .S2         B5                       ; |64| Branch to loop
||           ADD         .L2         B4,B6,B7                 ; |21| sum0 += (ai * bi)
||           ADD         .L1         A4,A0,A3                 ; |22| sum1 += (ai+1 * bi+1)
||           LDW         .D2         *-B8(20),B4              ;@ |24| load ai & a1 from memory
||           LDW         .D1         *-A5(20),A4              ;@ |25| load bi & b1 from memory
             MPY         .M2X        B4,A0,B4                 ; |40| ai * bi
||           MPYH        .M1X        B4,A0,A3                 ; |41| ai+1 * bi+1
||           ADD         .L2         B6,B7,B4                 ; |28| sum0 += (ai * bi)
||           ADD         .L1         A4,A3,A0                 ; |29| sum1 += (ai+1 * bi+1)
||           LDW         .D2         *-B8(16),B7              ;@ |31| load ai & a1 from memory
||           LDW         .D1         *-A5(16),A3              ;@ |32| load bi & b1 from memory
             MPY         .M2X        B7,A3,B9                 ; |47| ai * bi
||           MPYH        .M1X        B7,A3,A4                 ; |48| ai+1 * bi+1
||           ADD         .L2         B6,B4,B7                 ; |35| sum0 += (ai * bi)
||           ADD         .L1         A4,A0,A4                 ; |36| sum1 += (ai+1 * bi+1)
||           LDW         .D2         *-B8(12),B4              ;@ |38| load ai & a1 from memory
||           LDW         .D1         *-A5(12),A0              ;@ |39| load bi & b1 from memory
             MPY         .M2X        B6,A0,B6                 ; |54| ai * bi
||           MPYH        .M1X        B6,A0,A0                 ; |55| ai+1 * bi+1
||           ADD         .L2         B4,B7,B6                 ; |42| sum0 += (ai * bi)
||           ADD         .L1         A3,A4,A0                 ; |43| sum1 += (ai+1 * bi+1)
||           MVC         .S2         ISTP,B7                  ;@ |61| rd Interrupt Flag Register
||           LDW         .D2         *-B8(8),B7               ;@ |45| load ai & a1 from memory
||           LDW         .D1         *-A5(8),A3               ;@ |46| load bi & b1 from memory
             ADD         .L2         B9,B6,B7                 ; |49| sum0 += (ai * bi)
||           ADD         .L1         A4,A0,A3                 ; |50| sum1 += (ai+1 * bi+1)
||           EXTU        .S2         B7,0x17,0x1b,B0          ;@ |62| mask out interrupt bits
```

-continued

Example 1

```
||          LDW     .D2     *-B8(4),B6              ;@ |52| load ai & a1 from memory
||          LDW     .D1     *-A5(4),A0              ;@ |53| load bi & b1 from memory
||          MPY     .M2X    B4,A3,B4                ;@ |19| ai * bi
||          MPYH    .M1X    B4,A3,A4                ;@ |20| ai+1 * bi+1
            ADD     .L2     B6,B7,B6                ; |56| sum0 += (ai * bi)
            ADD     .L1     A0,A3,A0                ; |57| sum1 += (ai+1 * bi+1)
   [ A1]    SUB     .S1     A1,0x1,A1               ;@ |59| decrement loop counter
   [ B0]    ADDK    .S2     OFFSET,B5               ;@ |63| NO BRANCH — interrupt
            MPY     .M2X    B4,A4,B6                ;@ |26| ai * bi
||          MPYH    .M1X    B4,A4,A4                ;@ |27| ai+1 * bi+1
||          LDW     .D2     *B8++(24),B4            ;@@ |17| load ai & a1 from memory
||          LDW     .D1     *A5++(24),A3            ;@@ |18| load bi & b1 from memory
;** -------------------------------------------------------------------------- *
EPILOG              ; PIPED LOOP EPILOG ELIMINATED
;** -------------------------------------------------------------------------- *
            ADD     .L1X    B6,A0,A4                ; |66|
            B       .S2     B3                      ; Return from subroutine
            NOP             5
;** -------------------------------------------------------------------------- *
INTERRUPT_EPILOG:   ; DRAIN IN-FLIGHT REGISTER VALUES, SERVICE INTERRUPT
            MPY     .M2X    B7,A3,B6                ; |33| ai * bi
||          MPYH    .M1X    B7,A3,A4                ; |34| ai+1 * bi+1
||          ADD     .L2     B4,B6,B7                ; |21| sum0 += (ai * bi)
||          ADD     .L1     A4,A0,A3                ; |22| sum1 += (ai+1 * bi+1)
            MPY     .M2X    B4,A0,B4                ; |40| ai * bi
||          MPYH    .M1X    B4,A0,A3                ; |41| ai+1 * bi+1
||          ADD     .L2     B6,B7,B4                ; |28| sum0 += (ai * bi)
||          ADD     .L1     A4,A3,A0                ; |29| sum1 += (ai+1 * bi+1)
            MPY     .M2X    B7,A3,B9                ; |47| ai * bi
||          MPYH    .M1X    B7,A3,A4                ; |48| ai+1 * bi+1
||          ADD     .L2     B6,B4,B7                ; |35| sum0 += (ai * bi)
||          ADD     .L1     A4,A0,A4                ; |36| sum1 += (ai+1 * bi+1)
            MPY     .M2X    B6,A0,B6                ; |54| ai * bi
||          MPYH    .M1X    B6,A0,A0                ; |55| ai+1 * bi+1
||          ADD     .L2     B4,B7,B6                ; |42| sum0 += (ai * bi)
||          ADD     .L1     A3,A4,A0                ; |43| sum1 += (ai+1 * bi+1)
||          MVC     .S2     ISTP,B7                 ; **** rd Interrupt Flag Register
            ADD     .L2     B9,B6,B7                ; |49| sum0 += (ai * bi)
||          ADD     .L1     A4,A0,A3                ; |50| sum1 += (ai+1 * bi+1)
||          EXTU    .S2     B7,0x17,0x1b,B0         ; **** mask out interrupt bits
            ADD     .L2     B6,B7,B6                ; |56| sum0 += (ai * bi)
||          ADD     .L1     A0,A3,A0                ; |57| sum1 += (ai+1 * bi+1)
||  [ B0]   SUBK    .S2     OFFSET,B5               ; **** restore branch register
            B       .S2     B0                      ; **** branch to interrupt
||          MVK     .S1     1,A3                    ; **** setup ICR word
            MVK     .S2     INTERRUPT_PROLOG,B7     ; **** return addr is in -
            MVKH    .S2     INTERRUPT_PROLOG,B7     ; **** interrupt prolog!
            MVC     .S2     B7,IRP                  ; **** save return address
            SHL     .S2X    A0,B0,B0                ; **** create ICR word
            MVC     .S2     B0,ICR                  ; **** clear interrupt flag
```

Several concepts are critical to the design of a loop such as the one above according to the present invention. One critical concept is that although known execution order cannot be violated by asynchronous interruption while registers are multiply-assigned, the kernel is free to pursue an alternative known execution order in response to a condition that it detects itself. The second critical concept is that in-flight operations must be consumed by an alternative execution order, i.e., some sort of interrupt epilog should be used to "drain" the pipeline efficiently prior to branching to the interrupt. The last critical concept is that a resumption of loop execution after interrupt processing under these conditions requires the creation of an equivalent operational state, i.e., some sort of interrupt prolog should be executed in order to "fill" the pipeline before kernel operation is resumed.

The alternative execution order required for interrupt service according to the present invention can be initiated in a variety of ways. The loop kernel of Example 1 above reads the interrupt flag register, and if the interrupt bits are set, the loop address is modified to branch to an interrupt epilog instead of back to the top of the loop. Interrupt service may also be initiated by conditioning the loop branching instruction on the state of the interrupt bits, such that execution naturally falls into a loop epilog if an interrupt is requested. This epilog could be a conventional loop epilog (with some conditional operations that set up and branch to the interrupt service routine), or a specialized interrupt epilog that is bypassed during normal execution of a loop that has no conventional epilog (e.g., a loop utilizing speculative execution). Other methods of initiating an alternative execution order for the purpose of leaving a software pipelined loop will be obvious to one of ordinary skill in the art upon reading this specification.

The interrupt epilog serves at least two purposes. First, it insures that in-flight operations such as multiplies and loads will complete in a deterministic way. Second, the epilog sets up a return address that will cause the pipeline to refill properly upon a return from interrupt. Preferably, the interrupt epilog also completely "drains" the pipeline, by utilizing the values from in-flight load operations so that they need not be re-loaded after interrupt servicing. However, the preference for the last task lies primarily in efficiency—in most loops, these values could be thrown away and reloaded after interrupt service, with proper adjustment to the loop counter. One reason for choosing the "throw-away" approach may be to decrease interrupt latency even further.

The interrupt return address should be set to point to the interrupt prolog in order to insure the proper restoration of the operational state of the processor. One possible preferred approach is to set the interrupt return pointer to the address of a separate interrupt prolog that branches back to the loop. In a particularly preferred approach, as shown in Example 1 above, the interrupt prolog is actually a subset of the loop prolog, such that no additional code is required to allow re-entry to the loop.

The interrupt prolog should be designed to restore an equivalent operational state in the processor, i.e., equivalent to one that would have existed in the pipelined loop had the interrupt not been taken. Although the interrupt prolog operates much as the loop prolog, it necessarily fills the pipeline using the loop counter value existing at the time of the interrupt, instead of the initial loop counter value. If the loop prolog is designed with all initialization instructions preceding pipeline fill instructions, as in Example 1, the interrupt prolog can usually execute the identical pipeline fill instructions for re-entry. This code design advantageously allows for decreased code size.

Although the invention has been described herein with reference to a specific processor, it is recognized that one of ordinary skill can readily adapt the described embodiments to operate on other multiple execution unit processors that allow for multiple assignment of registers. Likewise, the use of the dot product is illustrative and not limiting—it is recognized that the invention may be readily practiced with software pipelined loops generally. And although the preferred embodiments have been described as responding to the value of interrupt bits in a register, one of ordinary skill in the art may readily substitute other runtime conditions detectable by the microprocessor in an embodiment of the invention. Other obvious modifications will be apparent to those of ordinary skill in the art upon reading this disclosure; such are intended to fall within the scope of the present invention.

What is claimed is:

1. A method of operating, in a pipelined loop, a processor having a plurality of execution units in communication with a plurality of registers, said method comprising the steps of:
   executing a pipelined loop kernel comprising a set of kernel instructions for a first number of iterations, said kernel utilizing a plurality of execution units with multiple assignment of registers to produce an output result;
   leaving the pipelined loop kernel prematurely in response to a runtime condition, thereby leaving at least one of said first number of iterations unfinished;
   executing a set of fill instructions to place said processor in an operational state equivalent to that which would have existed had said leaving in response to a runtime condition step not occurred; and
   re-entering said pipelined loop kernel and continuing said executing a pipelined loop kernel step, thereby producing said output result without alteration due to said leaving and re-entering steps.

2. The method of claim 1, further comprising the step of executing a set of loop prolog instructions immediately prior to said executing a pipelined loop kernel step.

3. The method of claim 2, wherein said executing a set of fill instructions step comprises re-executing at least a subset of said set of loop prolog instructions.

4. The method of claim 1, wherein:
   said runtime condition is a maskable interrupt;
   said maskable interrupt is masked during said executing a pipelined loop kernel step; and
   said loop kernel explicitly checks for the presence of an interrupt request within said set of kernel instructions.

5. The method of claim 1, wherein said kernel instructions comprise a loop branching operation, and wherein said leaving the pipelined loop kernel prematurely step comprises modifying the branch address of said loop branching operation temporarily to branch out of said pipelined loop.

6. The method of claim 1, wherein said kernel instructions comprise a loop branching operation, and wherein said leaving the pipelined loop kernel prematurely step comprises conditioning the execution of the loop branching operation upon the non-occurrence of said runtime condition.

7. The method of claim 1, wherein said leaving the pipelined loop kernel prematurely step comprises consuming in-flight register values.

8. A method of operating, in a pipelined loop, a processor having a plurality of execution units in communication with a plurality of registers, said method comprising the steps of:
   executing a loop prolog;
   executing a pipelined loop kernel for a predetermined number of iterations, said kernel utilizing a plurality of execution units with multiple assignment of registers to produce an output result;
   during said loop kernel, checking for the occurrence of a runtime condition;
   upon occurrence of the runtime condition, leaving the pipelined loop kernel prematurely and performing a function in response to said occurrence of the runtime condition; and
   executing an interrupt prolog, thereby re-entering said pipelined loop kernel and continuing said executing a kernel step, thereby producing said output result without alteration due to said leaving and re-entering steps.

9. The method of claim 8, wherein said runtime condition is the occurrence of an interrupt.

10. The method of claim 8, wherein said leaving the pipelined loop kernel prematurely step comprises branching to an interrupt service routine with a return address of said interrupt prolog.

11. The method of claim 8, wherein said pipelined loop kernel comprises an instruction that repetitively branches with a first address that re-executes the loop kernel until the predetermined number of iterations have been executed, wherein said leaving the pipelined loop kernel prematurely step is accomplished by modifying said first address upon said occurrence of a runtime condition, such that said branch instruction continues execution instead at the address of a condition epilog.

12. The method of claim 8, wherein said pipelined loop kernel comprises an instruction that repetitively branches with a first address that re-executes the loop kernel until the predetermined number of iterations have been executed, wherein said leaving the pipelined loop kernel prematurely step is accomplished by disabling said instruction upon said occurrence of a runtime condition, such that said processor continues execution at the location of a loop epilog.

13. The method of claim 8, wherein said interrupt prolog is also executed as a part of said executing a loop prolog step.

14. The method of claim 8, wherein said runtime condition is the occurrence of a data underflow or data overflow condition.

15. A method of operating, in a pipelined loop, a processor having a plurality of execution units in communication with a plurality of registers and having maskable interrupts, said method comprising the steps of:

masking said maskable interrupts;

executing a loop prolog;

executing a pipelined loop kernel for a predetermined number of iterations, said kernel utilizing a plurality of execution units with multiple assignment of registers to produce an output result;

during said loop kernel, checking for the occurrence of an interrupt request;

upon occurrence of said interrupt request, leaving the pipelined loop kernel prematurely and consuming all in-flight register values;

servicing said interrupt request; and executing an interrupt prolog, thereby re-entering said pipelined loop kernel and continuing said executing a kernel step, thereby producing said output result without alteration due to said leaving and re-entering steps.

16. The method of claim 15, wherein said interrupt prolog is a subset of said loop prolog.

* * * * *